United States Patent
Pino Jelcic (10) Patent No.: US 11,753,322 B2
(45) Date of Patent: Sep. 12, 2023

(54) SIDE STREAM TREATMENT FOR OVERFLOW

(71) Applicant: Evoqua Water Technologies LLC, Pittsburgh, PA (US)

(72) Inventor: Sergio Pino Jelcic, Waukesha, WI (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 404 days.

(21) Appl. No.: 16/862,870

(22) Filed: Apr. 30, 2020

(65) Prior Publication Data

US 2021/0087086 A1 Mar. 25, 2021

Related U.S. Application Data

(62) Division of application No. 15/320,052, filed as application No. PCT/US2015/037409 on Jun. 24, 2015, now Pat. No. 10,669,176.

(Continued)

(51) Int. Cl.
*C02F 3/00* (2023.01)
*C02F 3/04* (2023.01)
(Continued)

(52) U.S. Cl.
CPC ............... *C02F 3/006* (2013.01); *C02F 1/48* (2013.01); *C02F 1/5236* (2013.01); *C02F 1/56* (2013.01); *C02F 3/04* (2013.01); *C02F 3/06* (2013.01); *C02F 3/082* (2013.01); *C02F 3/12* (2013.01); *C02F 3/2806* (2013.01); *C02F 3/085* (2013.01);
(Continued)

(58) Field of Classification Search
CPC combination set(s) only.
See application file for complete search history.

(56) References Cited

U.S. PATENT DOCUMENTS

| | | |
|---|---|---|
| 10,669,176 B2 | 6/2020 | Pino-Jelcic |
| 2015/0210574 A1 | 7/2015 | Antonneau et al. |
| 2021/0087086 A1 | 3/2021 | Pino Jelcic |

FOREIGN PATENT DOCUMENTS

| | | |
|---|---|---|
| WO | 2013187979 | 12/2013 |
| WO | 2014065859 | 5/2014 |

(Continued)

OTHER PUBLICATIONS

Williams, Rhys J., "Examination Report under Section 18(3)", UK Patent Application No. 1620460.4, dated Mar. 17, 2021, 2 pages.

(Continued)

*Primary Examiner* — Hayden Brewster (57) ABSTRACT

A system and method of treating wastewater. In one embodiment, the system comprises a biological reactor fluidly connected to a source of wastewater and having a treated wastewater outlet, a fixed film biological reactor connected to the source of wastewater and having a fixed film effluent outlet, and a ballasted system fluidly connected to the fixed film effluent outlet. The ballasted system may comprise a ballast reactor tank configured to provide a ballasted effluent, and a source of ballast material fluidly connected to an inlet of the ballast reactor tank. The system may further comprise a bypass line having an inlet fluidly connected to the source of wastewater, a first outlet fluidly connected to the ballasted system, and a second outlet fluidly connected to the fixed film biological reactor, the bypass line configured to bypass the fixed film biological reactor.

8 Claims, 3 Drawing Sheets

Related U.S. Application Data (60) Provisional application No. 62/016,688, filed on Jun. 25, 2014.

(51) Int. Cl.
| | |
|---|---|
| *C02F 3/06* | (2023.01) |
| *C02F 3/08* | (2023.01) |
| *C02F 3/12* | (2023.01) |
| *C02F 3/28* | (2023.01) |
| *C02F 1/48* | (2023.01) |
| *C02F 1/52* | (2023.01) |
| *C02F 1/56* | (2023.01) |

(52) U.S. Cl.
CPC .......... *C02F 3/2826* (2013.01); *C02F 3/2833* (2013.01); *C02F 2209/001* (2013.01); *C02F 2209/003* (2013.01); *C02F 2209/005* (2013.01); *C02F 2209/08* (2013.01); *C02F 2209/10* (2013.01); *C02F 2209/14* (2013.01); *C02F 2209/15* (2013.01); *C02F 2209/36* (2013.01); *C02F 2209/40* (2013.01); *C02F 2301/043* (2013.01); *C02F 2305/12* (2013.01); *Y02W 10/10* (2015.05)

(56) References Cited

FOREIGN PATENT DOCUMENTS

| | | |
|---|---|---|
| WO | 2014153570 | 9/2014 |
| WO | 2015/200478 | 12/2015 |

OTHER PUBLICATIONS

Williams, Rhys J., "Examination Report under Section 18(3)", UK Patent Application No. 1620460.4, dated Sep. 30, 2020, 2 pages.
Young, Lee W., "Written Opinion", International Application No. PCT/US2015/037409, dated Nov. 6, 2015, 7 pages.
Young, Lee W., "International Search Report", International Application No. PCT/US2015/037409, dated Nov. 6, 2015, 4 pages.
Bai, Lingfei, "International Preliminary Report on Patentability", International Application No. PCT/US2015/037409, dated Dec. 27, 2016, 8 pages.
Westgate, Amy, "Requisition By The Examiner In Accordance With Subsection 86(2) Of The Patent Rules", Canadian Patent Application No. 2,945,824, dated Jul. 14, 2021, 4 pages.
"Requisition by The Examiner in Accordance With Subsection 86(2) of The Patent Rules" issued by the Canadian Intellectual Property Office regarding related Canadian patent application No. 2,945,824, dated Mar. 24, 2022, 3 pages.

SIDE STREAM TREATMENT FOR OVERFLOW

RELATED APPLICATIONS

This application claims priority under 35 U.S.C. § 119(e) to U.S. Provisional Application Ser. No. 62/016,688 titled "SIDE STREAM TREATMENT FOR CSO, SSO OR STORM WATER USING FIXED FILM AND MAGNETITE BALLASTED SYSTEMS," filed on Jun. 25, 2014, which is herein incorporated by reference in its entirety.

FIELD OF TECHNOLOGY

One or more aspects of the disclosure relate generally to water and wastewater treatment, and more particularly to systems and methods for water and wastewater treatment using fixed film processes, ballasted settling, and an overflow bypass line.

SUMMARY

A system for treating wastewater is provided. The system comprises a biological reactor fluidly connected to a source of wastewater and having a treated wastewater outlet. The system further comprises a fixed film biological reactor connected to the source of wastewater and having a fixed film effluent outlet. The method further comprises a ballasted system fluidly connected to the fixed film effluent outlet, the ballasted system comprising a ballast reactor tank configured to provide a ballasted effluent, and a source of ballast material fluidly connected to an inlet of the ballast reactor tank. The system further comprises a bypass line having an inlet fluidly connected to the source of wastewater, a first outlet fluidly connected to the ballasted system, and a second outlet fluidly connected to the fixed film biological reactor, the bypass line configured to bypass the fixed film biological reactor.

A method for treating a wastewater is also provided. The method comprises introducing wastewater from a source of wastewater to an influent conduit, measuring a property of the wastewater in the influent conduit to provide a property measurement. The method further comprises introducing at least a portion of the wastewater to a biological reactor based at least in part on the property measurement, and introducing at least a portion of the wastewater to a fixed film biological reactor. The method further comprises introducing an additional portion of the wastewater to the fixed film biological reactor based at least in part on the property measurement to provide a fixed film effluent. The method further comprises introducing at least a portion of the wastewater to a ballast reactor tank based at least in part on the property measurement, the ballast reactor tank configured to provide a ballasted effluent, and introducing the fixed film effluent to the ballast reactor tank.

A method of facilitating the treatment of wastewater in a wastewater treatment system comprising a conduit connected to an outlet of a source of wastewater and an inlet to a biological reactor is provided. The method comprises providing a diverter fluidly connectable to the source of wastewater and upstream of the biological reactor of the wastewater treatment system, the diverter configured to direct a portion of the wastewater from the conduit, and providing a fixed film biological reactor having an inlet connectable to the diverter, the fixed film biological reactor configured to receive an overflow volume of the source of wastewater and to provide a fixed film effluent. The method further comprises providing a bypass line fluidly connectable to the diverter and configured to bypass the fixed film reactor, and providing a ballasted system fluidly connectable to the fixed film effluent, the ballasted system comprising a ballast reactor tank configured to provide a ballasted effluent, and a source of ballast material fluidly connected to an inlet of the ballast reactor tank.

A method of treating wastewater during a high flow period is also provided. The method comprises establishing a first liquid circuit having liquid to be treated flowing therein from a source of wastewater to an inlet of a first biological reactor, establishing a second liquid circuit having liquid to be treated flowing therein from a source of wastewater to an inlet of at least one of a second biological reactor and a separation system, and establishing a third liquid circuit having an effluent from the second biological reactor flowing therein from the second biological reactor to at least one of the first biological reactor and the separation system.

DESCRIPTION OF THE DRAWINGS

The accompanying drawings are not intended to be drawn to scale. For purposes of clarity, not every component may be labeled in the drawings, nor is every component of each embodiment of the disclosure shown where illustration is not necessary to allow those of ordinary skill in the art to understand the disclosure.

In the drawings.

DETAILED DESCRIPTION

This disclosure is directed to systems and methods of treating water or wastewater to, for example, reduce the concentration of contaminants, and render the water suitable for secondary uses or discharge to the environment. One or more aspects of the disclosure relate to wastewater treatment systems and methods of operation and facilitating thereof. The disclosure is not limited in its application to the details of construction and the arrangement of components, systems, or subsystems set forth herein and is capable of being practiced or of being carried out in various ways.

One or more aspects of the disclosure relate to wastewater treatment systems experiencing elevated wastewater flow, and methods of operation and facilitating thereof. Elevated wastewater volume from wet weather events such as storms poses a challenge for municipal wastewater treatment systems. In some cases, water from storm drains may be mixed with wastewater, resulting in a large increase in volume during a wet weather event. In some instances, the large increase in volume may correspond to a large increase in contaminants. When this occurs, much of the excess wastewater may go untreated and may be discharged, resulting in potential pollution to rivers, bays, and estuaries, and other waterways or water sources. Discharged untreated wastewater may exceed discharge limits for various pollutants, for example particular contaminants, such as nitrogen or phosphorous. Elevated wastewater flow may refer to a high flow period that may be about 1.01 times or greater than the flow capacity of a conventional or existing wastewater treatment system. The elevated wastewater flow may be any increase in flow, for example, 1.5, 1.6, 1.7, 1.8, 1.9, 2.0, 2.5, 3.0, 4.0, 5.0, 10.0, times or higher than the flow capacity of a convention or existing treatment system.

Pollutants that may be discharged with untreated wastewater may include at least one of total suspended solids (TSS), biologically active organic matter, microorganisms, for example, pathogens or non-pathogens, nitrogen, and/or phosphorous. The presence of nitrogen and phosphorous in wastewater introduced into surface waters are primary causes of cultural eutrophication (i.e., nutrient enrichment due to human activity) in the surface waters. Surface waters are waters such as waterways or natural water sources, such as in a stream, river, lake, wetland, or ocean. The most recognizable manifestations of this eutrophication are algal blooms that occur during the summer Chronic symptoms of over-enrichment include low dissolved oxygen, fish kills, murky water, and depletion of desirable flora and fauna. In addition, the increase in algae and turbidity increases the need to chlorinate drinking water, which in turn, leads to higher levels of disinfection by-products that have been shown to increase the risk of cancer. Excessive amounts of nutrients can also stimulate the activity of microbes, such as microbes of the genus *Pfisteria*, which may be harmful to human health.

A significant percentage of all water body impairments are due to nutrient-related causes, for example, nutrients, oxygen depletion, algal growth, ammonia, harmful algal blooms, biological integrity and turbidity. In efforts to reduce the number of nutrient impairments, many point source dischargers have received more stringent effluent limits for nitrogen and phosphorous. Biological nutrient removal systems are utilized to remove total nitrogen and total phosphorous from wastewater through the use of microorganisms.

One or more aspects of the present disclosure involve embodiments directed to the removal of or for the reduction of the level of one or more contaminants from wastewater. One or more aspects of the disclosure relate to wastewater treatment systems and methods of operation and methods of modification thereof.

Typically, water to be treated, such as wastewater or a wastewater stream, contains waste matter that, in some instances, can comprise solids and soluble and insoluble organic and inorganic material. Prior to discharge to the environment, such streams may require treatment to decontaminate or at least partially render the wastewater streams benign or at least satisfactory for discharge under established regulatory requirements or guidelines. For example, the water can be treated to reduce its nitrogen content to within acceptable limits.

Systems and methods are provided for treating water or wastewater. In accordance with one or more embodiments, the disclosure relates to one or more systems and methods for treating wastewater, wherein the volume of wastewater to be treated exceeds capacity of the system. For example, under high flow periods or wet weather conditions, such as high storm water flow events, that exceed existing treatment capacity. In accordance with one or more embodiments, a diverter is provided to divert wastewater from the source of wastewater away from entering a biological reactor. In some embodiments, the diverter may divert the source of wastewater to a bypass line so as to divert a source of wastewater to a fixed film biological reactor. In some embodiments, the bypass line may be configured to divert a source of wastewater to a ballasted system. The bypass line may be referred to as an overflow line or overflow stream.

In some embodiments, start-up of the wastewater treatment system may comprise introducing wastewater from a source of wastewater to a biological reactor. A sensor may measure at least one property of the wastewater. For example, a sensor may measure the flow rate of the wastewater, or the concentration of one or more contaminants. In some embodiments, the measurement provided by the sensor may trigger introduction of a source of wastewater to a bypass line.

In some embodiments, such as during an overflow or high flow period, the sensor may measure a contaminant concentration in a treated water effluent as above a certain threshold level, and adjustments to the system may be made. For example, wastewater may be diverted to the bypass line. In some embodiments, when the sensor measures a contaminant concentration in a treated water effluent as at or below a certain threshold level, steady state would occur so as to continuously treat the wastewater.

The systems and methods may comprise treating a water or wastewater in a biological reactor. The systems and methods may comprise treating a water or wastewater in a fixed film reaction tank, also referred to as a fixed film biological reactor or attached growth system. The systems and methods may further comprise bypassing at least one of the biological reactor and the fixed film reaction tank. The systems and methods may further comprise treating at least one of the effluent from the biological reactor, the fixed film biological reactor, or the bypass stream in a ballasted settling process, or a ballasted flocculation system. The fixed film reactor may treat soluble particles (or soluble particulates), while the ballasted settling process or the ballasted flocculation system may treat insoluble particles (or insoluble particulates). In some embodiments, the fixed film biological reactor and/or the bypass line may be used to accommodate a higher flow period.

In accordance with one or more embodiments, the disclosure relates to one or more systems and methods for treating wastewater. The system may receive wastewater from a community, industrial, or residential source. For example, the wastewater may be delivered from a municipal or other large-scale sewage system. Alternatively, the wastewater may be generated, for example, from a factory such as a food processing or pulp and paper plants. The wastewater may be moved through the system by operations upstream or downstream of the system.

In accordance with one or more embodiments, the disclosure relates to one or more systems and methods for retrofitting a wastewater treatment system. Methods are provided for facilitating the treatment of wastewater in a wastewater treatment system. In an embodiment, a method comprises providing a diverter, a fixed film biological reactor, a bypass line, and a ballast reactor tank.

In some embodiments, for example in some embodiments in which retrofitting is taking place, a method of facilitating the treatment of wastewater is provided. The wastewater treatment system may comprise a conduit connected to an outlet of a source of wastewater and an inlet to a biological reactor. The method may comprise providing a diverter fluidly connectable to the source of wastewater and upstream of the biological reactor of the wastewater treatment system, the diverter configured to direct a portion of the wastewater from the conduit. The method may further comprise providing a fixed film biological reactor having an inlet connectable to the diverter, the fixed film biological reactor configured to receive an overflow volume of the source of wastewater and to provide a fixed film effluent. The method may further comprise providing a bypass line fluidly connectable to the diverter and configured to bypass the fixed film reactor, and providing a ballast system fluidly connectable to the fixed film effluent. The ballast system may comprise a ballast reactor tank configured to provide a ballasted effluent; and a source of ballast material fluidly connected to an inlet of the ballast reactor tank.

As used herein, the term "biological reactor" is a reactor having a population of microorganisms, which may include diverse types of bacteria, used to decompose biodegradable material. The conversion of pollutants or contaminants to innocuous compounds is typically facilitated or mediated by the microorganisms as the wastewater is passed through the wastewater treatment system. A biomass of microorganisms typically requires an environment that provides the proper conditions for growth or biological activity. A biological reactor may comprise a plurality of compartments or regions that may be partitioned or not. For example, a biological reactor may comprise aerobic, anaerobic, and/or anoxic compartments or regions. Further compartments of a biological reactor may comprise nitrification or denitrification compartments or regions. The size of the biological reactor may depend on the size of the wastewater treatment plant. For example, the size of the biological reactor may range from about 0.5 million gallons to about 100 million gallons. The biological reactor may comprise one or more reactors that are positioned in series or in parallel.

As used herein, the term "fixed film biological reactor" or "fixed film reactor" is a reactor having a population of biomass fixed onto any support or carrier that allows the biomass to contact the pollutants in the wastewater. For example, a fixed film biological reactor may comprise, without limitation, moving bed bioreactors (MBBRs), trickling filters, stationary packing media systems, and rotating biological contactors. As the biomass grows on the carrier, a bio-film is formed over the surfaces of the carrier. The bio-film removes pollutants or contaminants from the wastewater. The wastewater may be aerated or oxygenated to support aerobic biological processes in the fixed film biological reactor. The effluent of fixed film biological reactor may contain about 100 mg/l to about 500 mg/l of biological solids. In some embodiments, the fixed film effluent may contain between about 100 mg/l to about 200 mg/l. Aeration may be supplied in aerobic zones to supply oxygen and mixing to the system. In anaerobic, anoxic, or aerated anoxic based systems, mixers or mixers with aeration may be provided to maintain mixing throughout.

The fixed film biological reactor may provide an effluent comprising biological solids, often referred to as slough, which requires separation from a treated effluent in a downstream process. While fixed film biological reactors have a small footprint, effluent biological solids from the process are often difficult to settle with conventional sedimentation processes frequently requiring a large settling area.

A ballasted system may comprise a ballast reactor tank configured to provide a ballasted effluent and a source of ballast material fluidly connected to the ballast reactor tank. In some embodiments, the ballast system may comprise a source of coagulant fluidly connected to the ballast reactor tank. In some embodiments, the ballasted system may comprise a source of flocculant fluidly connected to the ballast reactor tank. In some embodiments, the ballasted system may comprise a source of adsorbant fluidly connected to the ballast reactor tank. The addition of ballast, and optionally additional components such as flocculant, coagulant, and/or adsorbant improves the removal of dissolved, colloidal, particulate and microbiological solids. The precipitation and enhanced settlability of ballasted solids provides for a more efficient, for example, smaller and or faster, clarification step as compared to conventional clarification systems, which may allow for a small footprint system comprising biological and clarification steps.

Flocculation may be a process of contact and adhesion whereby particles and colloids in liquid such as a water or wastewater form larger-size clusters of material. Particles may cluster together in a floc. A flocculant may comprise a material or a chemical that promotes flocculation by causing colloids and particles or other suspended particles in liquids to aggregate, forming a floc. Polymers may be used as flocculants. For example, acrylic acid/acrylamide copolymers and modified polyacrylamides may be used.

Coagulation may be a process of consolidating particles, such as colloidal solids. Coagulants may include cations. They may include cations such as aluminum, iron, calcium, or magnesium (positively charged molecules) that may interact with negatively charged particles and molecules that reduce the barriers to aggregation. Examples of coagulants include bentonite clay, polyaluminum chloride, polyaluminum hydroxychloride, aluminum chloride, aluminum chlorohydrate, aluminum sulfate, ferric chloride, ferric sulfate, and ferrous sulfate monohydrate.

Adsorption may be a physical and chemical process of accumulating a substance at the interface between liquid and solids phases. The adsorbant may be powdered activated carbon (PAC). PAC is an effective adsorbent because it is a highly porous material and provides a large surface area to which contaminants may adsorb. PAC may have a diameter of less than 0.1 mm and an apparent density ranging between about 20 and about 50 $lb/ft^3$. PAC may have a minimum iodine number of 500 as specified by AWWA standards.

According to some embodiments of the disclosure, a fixed film biological reactor may be used in conjunction with ballasted clarifiers to treat water or wastewater. The systems and methods of the present disclosure may be particularly advantageous, for example, in treatment plants where a small footprint is required such as, for example, a retrofit for industrial plants, small flow plants or package plants, hybrid wastewater plants, combining fixed film processes and activated sludge processes, and lagoon plants requiring nitrification. Also, this combination may be used in small flow systems that do not have significant operator interface yet require a high quality effluent. The use of a fixed film process in combination with ballasted settling is not limited to the examples given. Many uses in biological and chemical treatment of wastewater or potable water are possible.

In certain embodiments, a fixed film process followed by a ballasted flocculation process may be utilized for biological treatment of water or wastewater to remove at least one of nitrogen compounds, such as nitrates, biologically active organic matter, chemically active organic matter, and phosphorous compounds. Fixed film processes may oxidize ammonia to nitrate and/or reduce nitrate to nitrogen gas. Biological solids produced may then be removed in addition to dissolved, colloidal, and particulate solids by the ballasted clarifiers. In certain embodiments, at least one of nitrogen compounds, such as nitrates, BOD, COD, and phosphorous compounds may be removed prior to disinfection to provide potable water or drinking water to distribute it to a water supply grid.

Ballasted flocculation systems may comprise the addition of a ballast, and optionally, a coagulant and/or flocculant to improve the removal of dissolved, colloidal, particulate, and microbiological solids. In certain embodiments, the ballast may be a magnetic ballast.

The enhanced settlability of these ballasted solids may provide for a small clarification step, which may allow for a small footprint system comprising biological and clarification steps. In some, but not all, embodiments, recirculation of solids, either ballasted solids or ballast-free solids, to at least one of the ballasted flocculation processes, such as the ballast mixing step, and to the fixed film process can further enhance the reliability of the overall system. These features may be utilized in existing wastewater treatment plants, small flow plants or package plants, combined sewer overflow (CSO) treatment plants, new plants that require a small footprint, hybrid treatment plants (fixed film and activated sludge), and lagoon treatment plants requiring nitrification. One benefit is that an existing clarifier downstream of a fixed film process is readily convertible to a ballasted system using the system of the present disclosure. Conventional clarifiers may be even more readily convertible if the ballasted system uses a magnetic material, for example, magnetite, as the ballast.

In some embodiments of the disclosure, a system for treating wastewater is provided. The system comprises a fixed film reactor fluidly connected to a source of wastewater and configured to provide a fixed film effluent. A fixed film biological reactor may be employed which may comprise one or more fixed film reactors, which are utilized in parallel or in series, and in which one or more of the fixed film reactors is operational at a given point in time. In certain embodiments, the fixed film effluent may comprise about 100 mg/l to about 500 mg/l of biological solids. The fixed film effluent may flow to a ballasted flocculation system in which a source of coagulant may be fluidly connected to the fixed film effluent and configured to provide a coagulated effluent. A source of ballast may be fluidly connected to the coagulated effluent and configured to provide a ballasted effluent. In some embodiments, the source of ballast may be fluidly connected to at least one of the fixed film effluent or the coagulated effluent. The source of ballast may comprise a powdered ballast. The ballast may not be in a liquid such that it may be added in dry powdered form. In some embodiments, the ballast may be added by an operator or by machinery, such as by a dry feeder. It is to be understood that the source of ballast being fluidly connected to the fixed film effluent or the coagulated effluent or to any effluent or wastewater stream of the system, may comprise the source of ballast may be in a dry (non-liquid) or powdered form. A clarifier may be fluidly connected to the ballasted effluent, the clarifier comprising a treated effluent outlet and a ballasted solids outlet and configured to separate a treated effluent from a ballasted solids portion. The ballasted solids outlet of the clarifier may be fluidly connected to at least one of the coagulated effluent and the ballast reactor tank. In some embodiments, the ballasted solids outlet may be fluidly connected to the source of ballast.

A source of flocculant may be fluidly connected to the ballast reactor. At least one of the sources of coagulant, ballast, flocculant, and adsorbant may be provided in line to a fixed film effluent stream. Alternately, tanks may be used such that the fixed film effluent flows to a coagulant tank, into which a coagulant is added from a source of coagulant. The coagulated effluent may then flow to a ballast tank, into which a ballast is added from a source of ballast. The ballasted effluent may then flow to a flocculant tank, into which a flocculant is added from a source of flocculant. The flocculant effluent may then flow to the clarifier. In certain embodiments, a flocculant tank and source of flocculant may not be included in the ballasted flocculation system, and the ballasted effluent may flow directly to the clarifier. In some embodiments, a coagulant tank and source of coagulant may not be included in the ballasted flocculation system.

As discussed above, the ballast may be a magnetic ballast. The magnetic ballast may comprise an inert material. The magnetic ballast may comprise a ferromagnetic material. The magnetic ballast may comprise iron-containing material. In certain embodiments, the magnetic ballast may comprise an iron oxide material. For example, the magnetic ballast may comprise magnetite ($Fe_3O_4$). The magnetic ballast may have a particle size that allows it to bind with biological and chemical flocs to provide enhanced settling or clarification, and allow it to be attracted to a magnet so that it may be separated from the biological flocs. The particle size of the ballast, for example, the magnetic ballast, may be less than about 100 μm. In some embodiments, the particle size of the ballast, for example, the magnetic ballast, may be less than about 40 μm. In an embodiment, the particle size of the ballast, for example, the magnetic ballast may be less than about 20 μm. For example, the particle size may be between about 80 to about 100 μm, about 60 μm to about 80 μm, about 40 μm to about 60 μm, about 20 μm to about 40 μm, or about 1 μm to about 20 μm.

Sand ballasted systems often implement larger ballast sizes to effectively recover the ballast. Sand ballast is non-magnetic. Sand ballasted systems have implemented the use of cleaning agents to separate the biological solids from the sand particles. This could be a result of a large surface for bacteria to attach, requiring more than shearing forces of a vortex mechanism alone to remove biological solids from the sand particle surface, or the need to dissolve chemical bonds that assist in the binding of the ballast.

Unlike sand-based ballast that requires growth of floc around relatively large size sand particles, magnetite ballast can be used with small size, such as less than about 100 μm, allowing for the magnetite particles to impregnate existing floc. The result may be an enhanced separation of flocculants. The ballasted effluent or the flocculant effluent may be directed to at least one clarifier where ballasted solids, such as magnetite ballasted solids, may be removed by gravity at an enhanced rate greater than conventional gravity clarifiers. The clarifier, being configured to provide a treated effluent and a ballasted solids portion, may be fluidly connected to at least one of the source of ballast, the coagulated effluent, and the fixed film reactor. In certain embodiments, the ballasted solids outlet of the clarifier may be fluidly connected to at least one of the coagulated effluent and the ballast reactor tank. This may allow at least a portion of the ballasted solids to return to the ballast reactor tank and to the source of ballast, for example, the ballast tank connected to a source of ballast. All or a portion of the biological solids may also be removed from the system. This may involve utilizing a ballasted recovery system or wasting the biological solids prior to a ballasted recovery system. In some embodiments, the ballasted recovery system may comprise a magnetic separation apparatus, which may allow recovery of magnetic particles, which would not be feasible with, for example, sand particles. The recovery of the magnetic particles may be positioned, for example, downstream from the clarifier and upstream of the source of magnetite and/or the ballast reactor. In certain embodiments, mechanical shearing may be employed to shear the biological solids prior to ballast recovery, for example, prior to magnetite recovery. In some instances, such as re-seeding and high flow events, a portion of the settled biological solids may be recycled to the front of the ballast reactor tank. These solids may either be ballasted or solids stripped of magnetite through the magnetic separation. In certain embodiments, such as small-scale operations, it may not be necessary or feasible to recover the ballast, such as the magnetic ballast, from the system.

In certain embodiments, a ballasted recovery system may be positioned downstream of the ballasted solids outlet of the clarifier. The ballasted recovery system may be positioned upstream of at least one of the source of ballast and the fixed film reactor.

In certain embodiments, the user of a magnetic ballast provides advantages over use of other ballast materials. For example, a magnetic drum may be used to separate the biological solids from the magnetic ballast in an efficient manner Optionally, mechanical shearing may be utilized prior to separation. This process may sufficiently remove the biological solids from the ballast. Recirculation of settled solids to the ballast reaction tank further enhances performance and reliability, and allows for additional flexibility for treatability and recovery in process upsets or startups. In certain embodiments, cleaning solutions are unnecessary in separating ballast from the biological solids.

The present disclosure further comprises a bypass line. The bypass line may have an inlet fluidly connected to the source of wastewater, a first outlet fluidly connected to the ballasted system, and a second outlet fluidly connected to the fixed film biological reactor. The bypass line may be configured to bypass at least one of the biological reactor and the fixed film biological reactor.

In some embodiments, process control systems may be used. Typically, the control systems may be electrically connected to and may instruct valves (such as valves 32, 33, 34, 35, and 36 of FIG. 1) along the bypass line to open and close. The control system may provide for adjustment of valves to adjust flow rates through one or more of the valves. The control system may instruct valves along the bypass line to open and close based on the use of a sensor configured to measure a property. The property may be a property of the system. For example, the property may be a wastewater flow rate, a total wastewater volume, a total suspended solids, a total BOD, or a concentration of one or more contaminants, for example, microorganisms. The contaminant may be, for example, nitrogen or phosphorous. The control system may strategically adjust the degree of opening of one or more valves in the bypass line. For example, a valve in the bypass line may be at least partially opened to allow for a portion of wastewater to be introduced to the fixed film biological reactor. In addition, a valve in the bypass line may be at least partially opened to allow for a portion of wastewater to be introduced to the ballasted system. The degree of opening of the valves in the bypass line can influence the portions of wastewater introduced to the fixed film biological reactor and to the ballasted system. The portions of wastewater that are diverted can be determined by the capacity of the system in place without the bypass system present. For example, the valves may be opened to such a degree that half of the influent wastewater is introduced to the biological reactor, and half is introduced by way of a diverter to the bypass system. Further, the valves may be opened to such a degree that half of the overflow wastewater is introduced by way of a diverter to the fixed film biological reactor and half of the overflow wastewater is introduced to the ballasted system. Strategic management of the degree of opening of the valves may lead to overall improved removal of pollutants.

In certain embodiments, a wastewater treatment system may be in place, and being operated under normal conditions. The wastewater treatment system may encounter periods in which the capacity of the system cannot adequately treat the wastewater stream, for example, in a high flow time period. In these situations, it may be beneficial to retrofit the wastewater treatment system with one or more systems of the present disclosure. For example, a diverter may be put in place on an existing system so that the diverter may divert some of the incoming wastewater to a bypass line, which may be fluidly connected to one or more of a fixed film system or reactor, and a ballast system.

The control system may comprise one or more sensors. Non-limiting examples of sensors suitable for use in the methods and systems described herein may include flow meters, nitrate concentration probes or sensors, ammonia concentration probes or sensors, or any sensor capable of detecting a property of the wastewater at any point within the treatment system. The sensor may be positioned, for example, so as to determine the flow rate of the wastewater entering the system. In certain embodiments, the sensors may detect or measure a process parameter and report the value to the control system. The control system may be configured to compare the detected or measured value with a target value. Responsive to a result of the comparison, the control system may be configured to select a degree of opening of the valves.

In certain embodiments, the system may further comprise a measurement system. The measurement system may be in communication with the control system. In some embodiments, the measurement system may function as one or more components of a control system. The measurement system may be in communication with one or more sensors in the treatment system, as previously discussed. In various embodiments, the measurement system may be configured to measure one or more process parameters. For example, the measurement system may be configured to measure a level of nitrogen species in the source of wastewater. The measurement system may comprise one or more sensors.

A portion of the wastewater may be introduced to a biological reactor based at least in part on the property measurement. In some embodiments, a portion of the wastewater may be introduced to a fixed film biological reactor based at least in part on the property measurement. In some embodiments, an additional portion of the wastewater may be introduced to the fixed film biological reactor based at least in part on the property measurement to provide a fixed film effluent. In further embodiments, at least a portion of the wastewater may be introduced to a ballast reactor tank based at least in part on the property measurement.

Figure 1:
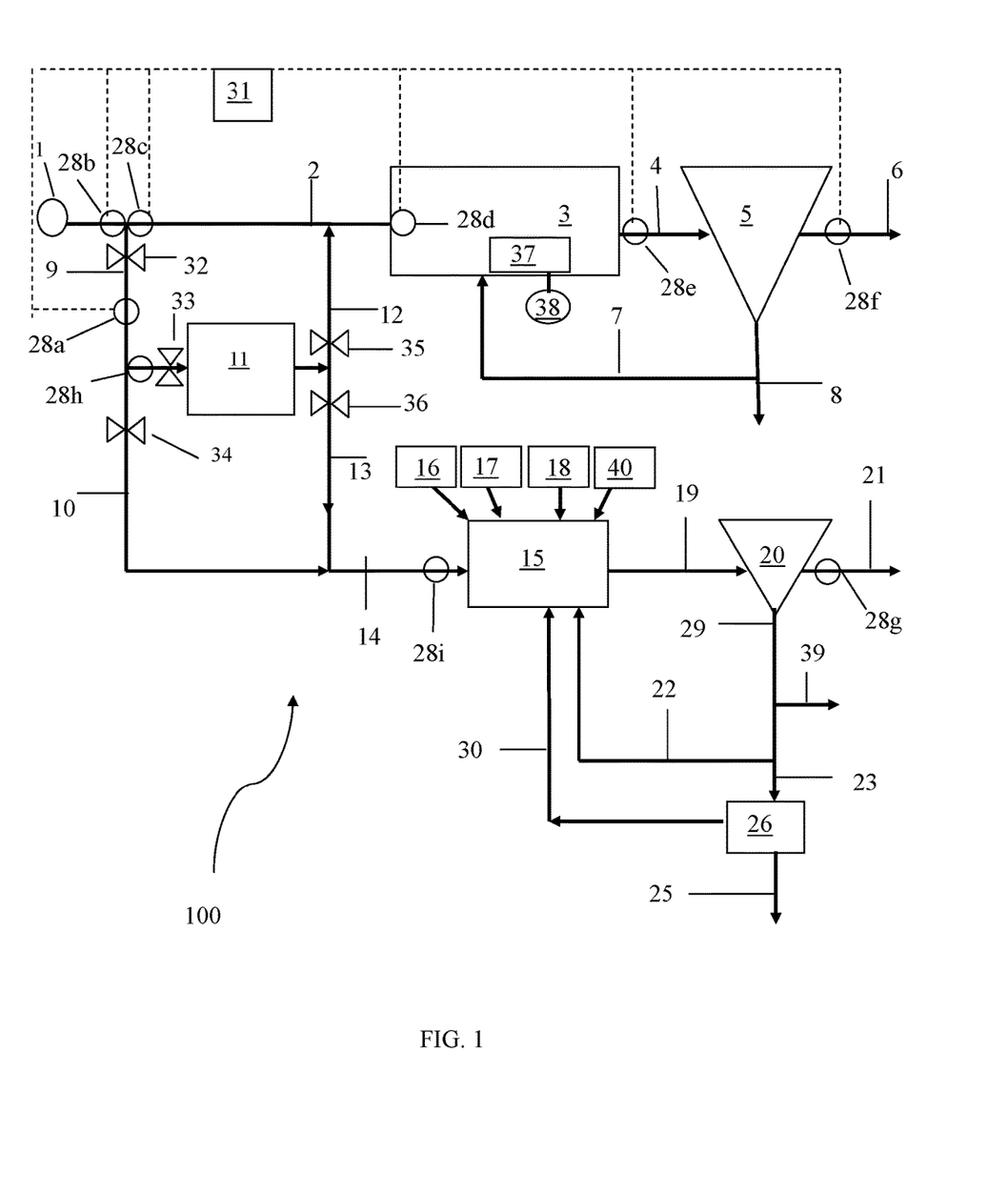
FIG. 1 presents a schematic of a treatment system implementing a fixed film process, a side-stream overflow bypass, ballasted settling, and recovery of ballast in accordance with one or more embodiments of the disclosure.

A system for treating wastewater is shown in FIG. 1. In accordance with any of the aforementioned aspects of the disclosure, treatment system 100 may comprise one or more treatment unit operations, which may include one or more biological reaction processes and one or more solids-reducing and solids-collecting systems or processes.

A source of wastewater 1 can be screened wastewater or primary clarification effluent. The source of wastewater may be received from a community, industrial, or residential source. For example, the wastewater may be delivered from a municipal or other large-scale sewage system. Alternatively, the wastewater may be generated, for example, by food processing or pulp and paper plants. The wastewater may be moved through the system by way of a pump upstream or downstream of the system. The source of wastewater may contain waste matter that, in some instances, can comprise solids and soluble and insoluble organic and inorganic material.

The wastewater treatment system includes a source of wastewater 1 fluidly connected through biological reactor influent conduit 2 to a biological reactor 3. Biological reactor 3 can be a reactor having activated sludge to form a first mixed liquor. The activated sludge can be a biological floc comprising a population of microorganisms capable of decomposing biodegradable material. For example, the activated sludge may comprise bacteria. Depending on the desired effluent, biological reactor 3 may be any of aerated anoxic, aerobic, and anaerobic. In an embodiment, biological reactor 3 may be an aerated anoxic zone including an aerator providing dissolved oxygen sufficient to maintain anoxic conditions and contributing to the movement of the contents of the biological reactor 3 if desired. Optional aerator 37 is shown in FIG. 1, and may be connected to a source of gas 38. Source of gas 38 may be air, oxygen, or other gases typically used in biological treatment processes.

Wastewater treatment system 100 may include one or more sensors 28. For example, sensor 28a may be positioned in the bypass stream. Sensor 28b may be positioned in the influent wastewater stream. Sensor 28c may be placed downstream of a diverter 41. Sensor 28e may be positioned at the outlet of the biological reactor 3. Sensor 28f may be positioned at the outlet of clarifier 5. Sensor 28g may be positioned at the outlet of clarifier 20. Sensor 28h may be positioned at the inlet of the fixed film biological reactor 11. Sensor 28i may be positioned at the inlet of the ballast reactor tank 15. Sensors 28a-28i may be present in system 100. When referring to sensor 28, it is understood that this may refer to any one or more of sensors 28a-28i.

Biological reactor 3 may include a sensor 28d, or a plurality of such sensors, which are configured to measure a quality of a first mixed liquor contained in biological reactor 3. Sensor 28 may measure, for example, the flow rate, volume, total suspended solids, total BOD, or species, for example, microorganism, concentration in the first mixed liquor. Sensor 28d may measure the concentration of nitrate and/or ammonia in the first mixed liquor, for example, wastewater in the biological reactor 3. Sensor 28d is illustrated in FIG. 1 as being disposed within biological reactor 3, however, in other embodiments, any sensor 28 (or an additional sensor) can be provided on biological reactor influent conduit 2 or on biological reactor effluent conduit 4, for example. In some embodiments, it is desirable to position sensor 28 at a location in biological reactor 3 where there is significant mixing of the contents of biological reactor 3 to provide a representative measurement of the conditions within biological reactor 3 as a whole. Sensor 28 may be placed at any position upstream or downstream of a unit operation, or within a unit operation.

Sensor 28 may communicate, electrically or otherwise, with a controller 31 to provide the controller with a signal corresponding to a property of the source of wastewater 1. Controller 31 may control the degree of opening of valves 32, 33, 34, 35, and 36. One or more of valves 32, 33, 34, 35, and 36 may be connected to controller 31, however, to avoid complication, the connection is not shown in FIG. 1.

The controller 31 of the systems disclosed herein may be implemented using one or more computer systems. The computer system may be, for example, a general-purpose computer such as those based on an Intel® CORE™ type processor or Intel® Atom™ type processor, a Motorola PowerPC® processor, a Sun UltraSPARC® processor, a Hewlett-Packard PA-RISC® processor, or any other type of processor or combinations thereof. Alternatively, the computer system may include specially-programmed, special-purpose hardware, for example, an application-specific integrated circuit (ASIC) or controllers intended for analytical systems.

The computer system can include one or more processors typically connected to one or more memory devices, which can comprise, for example, any one or more of a disk drive memory, a flash memory device, a RAM memory device, or other device for storing data. The memory is typically used for storing programs and data during operation of the treatment system and/or computer system. Software, including programming code that implements embodiments of the disclosure, can be stored on a computer readable and/or writable nonvolatile recording medium, and then typically copied into memory wherein it can then be executed by the processor. Components of the computer system may be coupled by an interconnection mechanism, which may include one or more busses (e.g., between components that are integrated within a same device) and/or a network (e.g., between components that reside on separate discrete devices). The interconnection mechanism enables communications (e.g., data, instructions) to be exchanged between components of the computer system. The computer system can also include one or more input devices, for example, sensors such as any of sensors 28a-28i, a keyboard, mouse, trackball, microphone, touch screen, and one or more output devices, for example, a printing device, display screen, or speaker. In addition, the computer system may contain one or more interfaces that can connect the computer system to a communication network (in addition or as an alternative to the network that may be formed by one or more of the components of the computer system).

According to one or more embodiments, the one or more input devices may include sensors for measuring parameters. Alternatively, the sensors, valves, and/or pumps of the wastewater treatment system 100, or all of these components may be connected to a communication network that is operatively coupled to the computer system.

Controller 31 can include one or more computer storage media such as readable and/or writeable nonvolatile recording medium in which signals can be stored that define a program to be executed by one or more processors. Storage medium may, for example, be a disk or flash memory. Although the computer system may be one type of computer system upon which various aspects may be practiced, it should be appreciated that aspects and embodiments are not limited to being implemented in software, or on a general purpose computer system. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects may be implemented in software, hardware or firmware, or any combination thereof. For example, one or more segments of an algorithm executable by the controller can be performed in separate computers, which in turn, can be communication through one or more networks.

A biological reactor effluent may exit biological reactor 3 by way of a biological reactor outlet and into biological reactor effluent conduit 4. The biological reactor effluent may comprise treated wastewater and activated sludge. The biological reactor effluent may be directed to a secondary clarifier 5. Secondary clarifier 5 is configured to separate treated wastewater 6 from activated sludge. Activated sludge may further be separated into return activated sludge 7 and waste activated sludge 8. Return activated sludge may be returned to biological reactor 3 to further treat wastewater. Waste activated sludge 7 may be delivered to another location of the system to be further treated. Treated wastewater 6 may be delivered to any system, in which it meets the secondary effluent concentration limit. The secondary effluent concentration limit may be 30 mg/L of TSS and/or 30 mg/L of BOD. In one embodiment, the TSS concentration may be less than 10 mg/L. In one embodiment, the BOD concentration may be less than 10 mg/L. In one example, the total nitrogen concentration may be less than 3 mg/L. In another example, the total phosphorous concentration may be less than 1 mg/L. Treated wastewater 6 may have one or more of these characteristics. Treated wastewater 6 may be delivered to, for example, surface waters or a processing plant.

Wastewater treatment system 100 may further comprise a diverter 9 configured to divert flow of source of wastewater 1 from biological reactor 3 to a fixed film biological reactor 11. Diverter 9 may be a valve configured to open and close based at least in part on a signal from sensor 28. Under normal operating conditions, a portion of the source of wastewater 1 is diverted by diverter 9 away from entering biological reactor 3 to fixed film biological reactor 11. Fixed film biological reactor 11 can be a reactor having a population of biomass fixed onto a support or carrier that allows the biomass to contact pollutants in the wastewater. For example, fixed film biological reactor 11 may comprise moving bed bioreactors, trickling filters, stationary packing media, and rotating biological contactors. A bio-film is formed over the surfaces of the carrier and removes pollutants from the wastewater. Depending on the desired effluent, fixed film biological reactor 11 may be any of aerated anoxic, aerobic, and anaerobic. In an embodiment, fixed film biological reactor 11 may be an aerated anoxic zone including an aerator providing dissolved oxygen sufficient to maintain anoxic conditions and contributing to the movement of the contents of fixed film biological reactor 11 if desired. Under normal operating conditions, fixed film biological reactor 11 may provide an effluent comprising biological solids. In some embodiments, fixed film effluent may be optionally directed to biological reactor 3 via return fixed film effluent conduit 12 to separate the biological solids from wastewater.

In some embodiments, under high flow period operating conditions in which an overflow volume of source of wastewater 1 is present, an additional portion of source of wastewater 1 is diverted away from entering biological reactor 3 to fixed film biological reactor 11 based at least in part on a signal from sensor 28. Fixed film effluent may be directed to a ballast reactor tank 15 via a fixed film effluent conduit 13 to separate biological solids from wastewater.

The Ballasted system can comprise a ballast reactor tank 15 configured to provide a ballasted effluent 19 and a source of ballast material 17 fluidly connected to the ballast reactor tank 15. In some embodiments, the ballast material can be a magnetic ballast. The magnetic ballast may comprise an inert material. The magnetic ballast may comprise a ferromagnetic material. The magnetic ballast may comprise iron-containing material. In certain embodiments, the magnetic ballast may comprise an iron oxide material. For example, the magnetic ballast may comprise magnetite ($Fe_3O_4$). The magnetic ballast may have a particle size that allows it to bind with biological flocs to provide enhanced settling or clarification and allow it to be attracted to a magnet so that it may be separated from the biological flocs. The particle size of the magnetic ballast may be less than 100 µm. In some embodiments, the particle size of the magnetic ballast may be less than about 40 µm. In an embodiment, the particle size of the magnetic ballast may be less than about 20 µm. For example, the particle size may be between about 80 µm to about 100 µm, about 60 µm to about 80 µm, about 40 µm to about 60 µm, about 20 µm to about 40 µm, or about 1 µm to about 20 µm. The particle size referred to herein may be an average particle size. In some embodiments, the ballast material can be magnetite. The ballast can be added in dry powdered form. In some embodiments, the ballast material may be added by an operator or by machinery. For example, ballast material 17 may be added by a dry feeder.

In some embodiments, ballast reactor tank 15 is fluidly connected to a source of flocculant 18. Flocculant 18 may comprise a material or a chemical that promotes flocculation by causing colloids and particles or other suspended particles in liquids to aggregate, forming a floc. Flocculant 18 may be a polymer. For example, flocculant 18 may be acrylic acid/acrylamide copolymers or modified polyacrylamides.

In some embodiments, ballast reactor tank 15 is fluidly connected to a source of coagulant 16. Coagulant 16 may comprise cations that interact with negatively charged particles and molecules that reduce the barriers to aggregation. For example, coagulant 16 may comprise aluminum, iron, calcium, or magnesium. Coagulant 16 may further comprise bentonite clay, polyaluminum chloride, polyaluminum hydroxychloride, aluminum chloride, aluminum chlorohydrate, aluminum sulfate, ferric chloride, ferric sulfate, and ferrous sulfate monohydrate.

In some embodiments, ballast reactor tank 15 is fluidly connected to a source of adsorbant 40. Source of adsorbant 40 may comprise an activated carbon. For example, adsorbant 40 may comprise powdered activated carbon.

Ballasted effluent 19 can be directed from ballast reactor tank 15 to a clarifier 20, for example a high-rate clarifier. Clarifier 20 is configured to separate a treated wastewater portion 21 from a ballasted solids portion 29. Treated wastewater portion 21 may be delivered to any system in which it meets the secondary effluent concentration limit. The secondary effluent concentration limit may be 30 mg/L of TSS and/or 30 mg/L of BOD. In one embodiment, the TSS concentration may be less than 10 mg/L. In one embodiment, the BOD concentration may be less than 10 mg/L. In one example, the total nitrogen concentration may be less than 3 mg/L. In another example, the total phosphorous concentration may be less than 1 mg/L. Treated wastewater portion 21 may have one or more of these characteristics. Treated wastewater portion 21 may be delivered to, for example, surface waters or a processing plant. Ballasted solids portion 29 may further be separated into a waste ballasted solids portion 23 and a recycled ballasted solids portion 22. In some embodiments, all or a portion of ballasted solids portion 29 may be discarded through wasted solids outlet 39. In some embodiments, all of ballasted solids portion 29 may be discarded through wasted solids outlet 39, for example, when recycling of the ballast may not be desired or necessary. Recycled ballasted solids portion 22 may be returned to ballast reactor tank 15 to further treat wastewater. Waste ballasted solids portion 23 can further be separated into discarded ballasted solids portion 25 and a ballasted solids recovery portion 30 by ballast material recovery system. Ballast material recovery system 26 may comprise a means for recovering ballast material. Ballast material recovery system may comprise a magnetic separation apparatus. In certain embodiments, mechanical shearing may be employed through the use of a mechanical shearer to shear the biological and chemical solids prior to ballast recovery, for example, prior to magnetite recovery. For example, ballast material recovery system 26 may comprise a shear mill, a hydrocyclone and/or a rotating drum comprising a fixed array of rare-earth magnets. Ballast material recovery system 26 may separate a recovered ballast material portion 30 from a waste solids portion 25. Recovered ballast material portion 30 can be directed back to ballast reactor tank 15 for further processing.

In some embodiments, under high flow period operating conditions in which a volume of source of wastewater 1 is present, a portion of source of wastewater 1 is diverted away from entering biological reactor 3 directly to the ballasted system based at least in part on a signal from sensor 28. Ballasted system can comprise a ballast reactor tank 15 configured to provide a ballasted effluent 19 and a source of ballast material 17 fluidly connected to the ballast reactor tank 15. In some embodiments, the ballast material can be a magnetic ballast, as described throughout this disclosure.

In some embodiments, ballast reactor tank 15 is fluidly connected to a source of flocculant 18. Flocculant 18 may comprise a material or a chemical that promotes flocculation by causing colloids and particles or other suspended particles in liquids to aggregate, forming a floc. Flocculant 18 may be a polymer. For example, flocculant 18 may be acrylic acid/acrylamide copolymers or modified polyacrylamides.

In some embodiments, ballast reactor tank 15 is fluidly connected to a source of coagulant 16. Coagulant 16 may comprise cations that interact with negatively charged particles and molecules that reduce the barriers to aggregation. For example, coagulant 16 may comprise aluminum, iron, calcium, or magnesium. Coagulant 16 may further comprise bentonite clay, polyaluminum chloride, polyaluminum hydroxychloride, aluminum chloride, aluminum chlorohydrate, aluminum sulfate, ferric chloride, ferric sulfate, and ferrous sulfate monohydrate.

In some embodiments, ballast reactor tank 15 is fluidly connected to a source of adsorbant 40. Source of adsorbant 40 may comprise an activated carbon. For example, adsorbant 40 may comprise powdered activated carbon.

Ballasted effluent 19 can be directed from ballast reactor tank 15 to a high-rate clarifier 20. High-rate clarifier 20 is configured to separate a treated wastewater portion 21 from a ballasted solids portion 29. Ballasted solids portion 29 may further be separated into a waste ballasted solids portion 23 and a recycled ballasted solids portion 22. In some embodiments, all or a portion of ballasted solids portion 29 may be discarded through wasted solids outlet 39. In some embodiments, all of ballasted solids portion 29 may be discarded through wasted solids outlet 39, for example, when recycling of the ballast may not be desired or necessary. Recycled ballasted solids portion 22 may be returned to ballast reactor tank 15 to further treat wastewater. Waste ballasted solids portion 23 can further be separated into discarded ballasted solids portion 25 and a ballasted solids recovery portion 30 by ballast material recovery system. Discarded ballasted solids portion 25 may be discarded without recovering ballasted solids. Ballast material recovery system 26 may comprise a means for recovering ballast material. For example, ballast material recovery system 26 may comprise a shear mill, a hydrocyclone and/or a rotating drum comprising a fixed array of rare-earth magnets. Ballast material recovery system 26 may separate a recovered ballast material portion 30 from a waste solids portion 25. Recovered ballast material portion 30 can be directed back to ballast reactor tank 15 for further processing.

Figure 2:
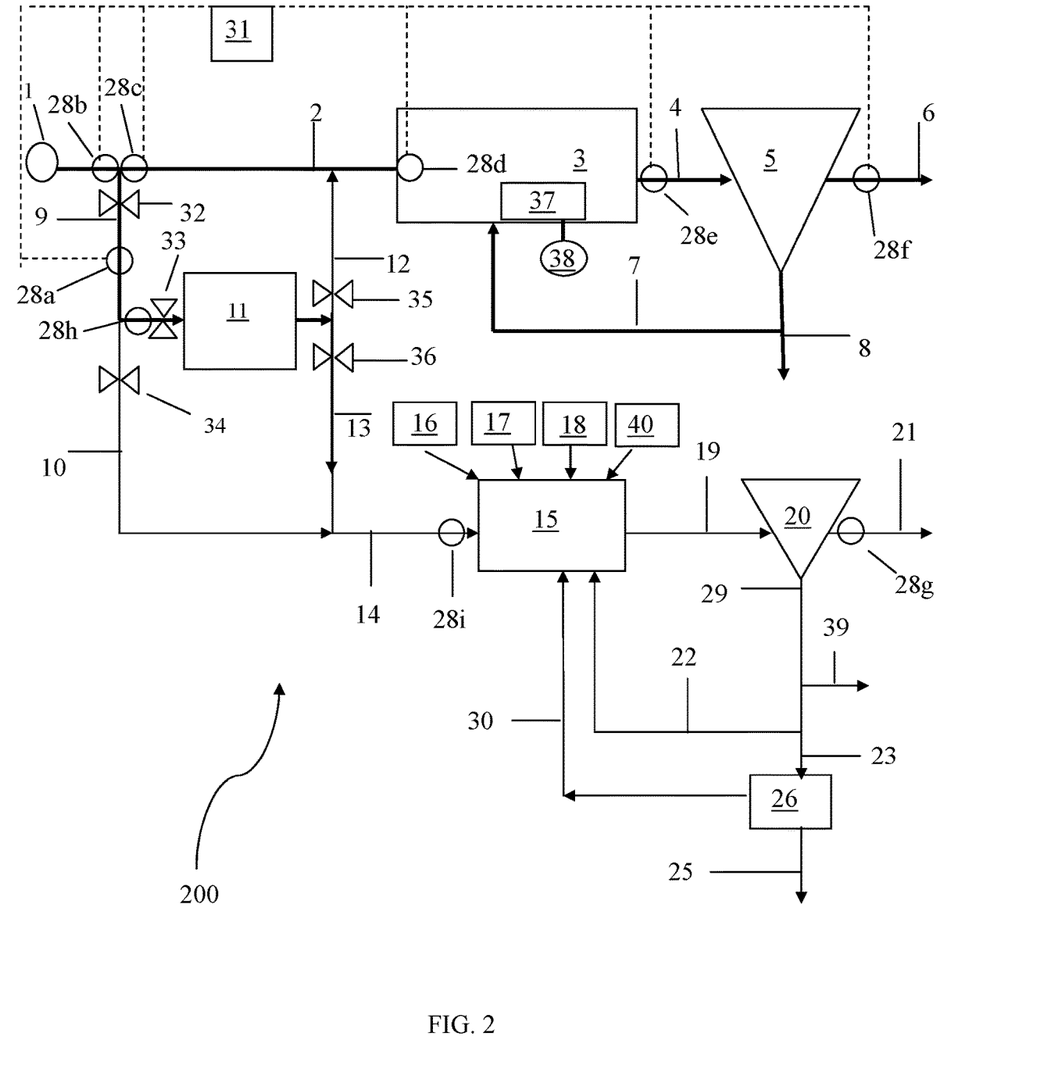
FIG. 2 presents a schematic of a treatment system implementing a fixed film process, and a side-stream overflow bypass, in accordance with one or more embodiments of the disclosure.

A system for treating wastewater under normal operating conditions is shown in FIG. 2. In accordance with any of the aforementioned aspects of the disclosure, treatment system 200 may comprise one or more treatment unit operations, which may include one or more biological reaction processes and one or more solids-reducing and solids-collecting systems or processes.

A source of wastewater 1 can be screened wastewater or primary clarification effluent. The source of wastewater may be received from a community, industrial, or residential source. For example, the wastewater may be delivered from a municipal or other large-scale sewage system. Alternatively, the wastewater may be generated, for example, by food processing or pulp and paper plants. The wastewater may be moved through the system by way of a pump upstream or downstream of the system. The source of wastewater may contain waste matter that, in some instances, can comprise solids and soluble and insoluble organic and inorganic material.

The wastewater treatment system includes a source of wastewater 1 fluidly connected through biological reactor influent conduit 2 to a biological reactor 3. Biological reactor 3 can be a reactor having activated sludge to form a first mixed liquor. The activated sludge can be a biological floc comprising a population of microorganisms capable of decomposing biodegradable material. For example, the activated sludge may comprise bacteria. Depending on the desired effluent, biological reactor 3 may be any of aerated anoxic, aerobic, and anaerobic. In an embodiment, biological reactor 3 may be an aerated anoxic zone including an aerator providing dissolved oxygen sufficient to maintain anoxic conditions and contributing to the movement of the contents of the biological reactor 3 if desired. Optional aerator 37 is shown in FIG. 2, and may be connected to a source of gas 38. Source of gas 38 may be air.

Wastewater treatment system 200 may include one or more sensors 28. In an embodiment, sensor 28a may be positioned in the bypass stream. In another embodiment, sensor 28b may be positioned in the influent wastewater stream. In another embodiment, sensor 28c may be placed downstream of a diverter 41. In another embodiment, sensor 28e may be positioned at the outlet of the biological reactor 3. In an embodiment, sensor 28f may be positioned at the outlet of clarifier 5. In other embodiments, one or more sensors 28a-28i may be present in system 200.

Biological reactor 3 may include a sensor 28d, or a plurality of such sensors, which are configured to measure a quality of the first mixed liquor. Sensor 28 may measure, for example, the flow rate, volume, or species concentration in the first mixed liquor. Sensor 28 may measure the concentration of nitrate and/or ammonia in the first mixed liquor, for example, wastewater in the biological reactor 3. Sensor 28d is illustrated in FIG. 2 as being disposed within biological reactor 3, however, in other embodiments, any sensor 28 (or an additional sensor) can be provided on biological reactor influent conduit 2 or on biological reactor effluent conduit 4, for example. In some embodiments, it is desirable to position sensor 28 at a location in biological reactor 3 where there is significant mixing of the contents of biological reactor 3 to provide a representative measurement of the conditions within biological reactor 3 as a whole. Sensor 28 may be placed at any position upstream or downstream of a unit operation.

Sensor 28 may communicate, electrically or otherwise, with a controller 31 to provide the controller with a signal corresponding to a property of the source of wastewater 1. Controller 31 may control the degree of opening of valves 32, 33, and 34. One or more of valves 32, 33, 34, 35, and 36 may be connected to controller 31, however, to avoid complication, the connection is not shown in FIG. 2. Controller 31 may be any controller in accordance with the description of controller 31 of FIG. 1.

A biological reactor effluent may exit biological reactor 3 by way of a biological reactor outlet and into biological reactor effluent conduit 4. The biological reactor effluent may comprise treated wastewater and activated sludge. The biological reactor effluent may be directed to a secondary clarifier 5. Secondary clarifier 5 is configured to separate treated wastewater 6 from activated sludge. Activated sludge may further be separated into return activated sludge 7 and waste activated sludge 8. Return activated sludge may be returned to biological reactor 3 to further treat wastewater. Waste activated sludge 7 may be delivered to another location of the system to be further treated. Treated wastewater 6 may be delivered to, for example, surface waters or a processing plant.

Wastewater treatment system 200 may further comprise a diverter 9 configured to divert flow of source of wastewater 1 from biological reactor 3 to a fixed film biological reactor 11. Diverter 9 may be a valve configured to open and closed based at least in part on a signal from sensor 28. Under normal operating conditions, a portion of the source of wastewater 1 is diverted by diverter 9 away from entering biological reactor 3 to fixed film biological reactor 11. Fixed film biological reactor 11 can be a reactor having a population of biomass fixed onto a support or carrier that allows the biomass to contact pollutants in the wastewater. For example, fixed film biological reactor 11 may comprise moving bed bioreactors, trickling filters, and rotating biological contactors. A bio-film is formed over the surfaces of the carrier and removes pollutants from the wastewater. Depending on the desired effluent, fixed film biological reactor 11 may be any of aerated anoxic, aerobic, and anaerobic. In an embodiment, fixed film biological reactor 11 may be an aerated anoxic zone including an aerator providing dissolved oxygen sufficient to maintain anoxic conditions and contributing to the movement of the contents of fixed film biological reactor 11 if desired. Under normal operating conditions, fixed film biological reactor 3 may provide an effluent comprising biological solids. In some embodiments, fixed film effluent may be optionally directed to biological reactor 3 via return fixed film effluent conduit 12 to separate the biological solids from wastewater.

Figure 3:
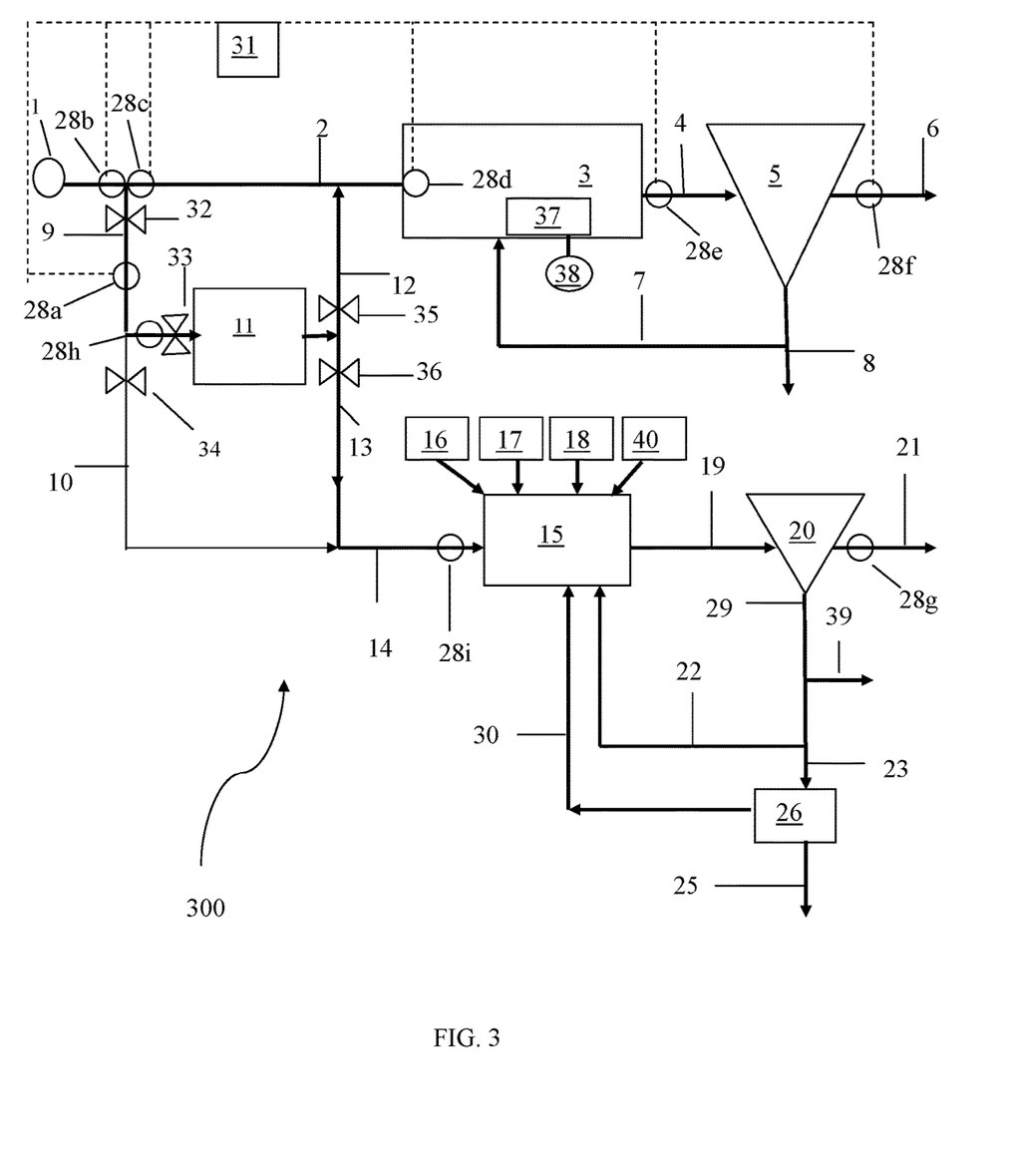
FIG. 3 presents a schematic of a treatment system implementing a fixed film process, a side-stream overflow bypass, ballasted settling, and recovery of ballast in accordance with one or more embodiments of the disclosure.

A system for treating wastewater comprising an overflow volume is shown in FIG. 3. In accordance with any of the aforementioned aspects of the disclosure, treatment system 300 may comprise one or more treatment unit operations, which may include one or more biological reaction processes and one or more solids-reducing and solids-collecting systems or processes.

A source of wastewater 1 can be screened wastewater or primary clarification effluent. The source of wastewater may be received from a community, industrial, or residential source. For example, the wastewater may be delivered from a municipal or other large-scale sewage system. Alternatively, the wastewater may be generated, for example, by food processing or pulp and paper plants. The wastewater may be moved through the system by way of a pump upstream or downstream of the system. The source of wastewater may contain waste matter that, in some instances, can comprise solids and soluble and insoluble organic and inorganic material.

The wastewater treatment system includes a source of wastewater 1 fluidly connected through biological reactor influent conduit 2 to a biological reactor 3. Biological reactor 3 can be a reactor having activated sludge to form a first mixed liquor. The activated sludge can be a biological floc comprising a population of microorganisms capable of decomposing biodegradable material. For example, the activated sludge may comprise bacteria. Depending on the desired effluent, biological reactor 3 may be any of aerated anoxic, aerobic, and anaerobic. In an embodiment, biological reactor 3 may be an aerated anoxic zone including an aerator providing dissolved oxygen sufficient to maintain anoxic conditions and contributing to the movement of the contents of the biological reactor 3 if desired. Optional aerator 37 is shown in FIG. 3, and may be connected to a source of gas 38. Source of gas 38 may be air.

Wastewater treatment system 300 may include one or more sensors 28. In an embodiment, sensor 28a may be positioned in the bypass stream. In another embodiment, sensor 28b may be positioned in the influent wastewater stream. In another embodiment, sensor 28c may be placed downstream of a diverter 41. In another embodiment, sensor 28e may be positioned at the outlet of the biological reactor 3. In an embodiment, sensor 28f may be positioned at the outlet of clarifier 5. In another embodiment, sensor 28g may be positioned at the outlet of clarifier 20. In another embodiment, sensor 28h may be positioned at the inlet of fixed film biological reactor 11. In another embodiment, sensor 28i may be positioned at the inlet of ballast reactor tank 15. In other embodiments, one or more sensors 28a-28i may be present in system 300.

Biological reactor 3 may include a sensor 28d, or a plurality of such sensors, which are configured to measure a quality of the first mixed liquor. Sensor 28 may measure, for example, the flow rate, volume, or species concentration in the first mixed liquor. Sensor 28 may measure the concentration of nitrate and/or ammonia in the first mixed liquor, for example, wastewater in the biological reactor 3. Sensor 28d is illustrated in FIG. 3 as being disposed within biological reactor 3, however, in other embodiments, sensor 28 (or an additional sensor) can be provided on biological reactor influent conduit 2 or on biological reactor effluent conduit 4, for example. In some embodiments, it is desirable to position sensor 28 at a location in biological reactor 3 where there is significant mixing of the contents of biological reactor 3 to provide a representative measurement of the conditions within biological reactor 3 as a whole. Sensor 28 may be placed at any position upstream or downstream of a unit operation.

Sensor 28 may communicate, electrically or otherwise, with a controller 31 to provide the controller with a signal corresponding to a property of the source of wastewater 1. Controller 31 may control the degree of opening of valves 32, 33, and 34. One or more of valves 32, 33, 34, 35, and 36 may be connected to controller 31, however, to avoid complication, the connection is not shown in FIG. 3. Controller 31 may be any controller in accordance with the description of controller 31 of FIG. 1.

A biological reactor effluent may exit biological reactor 3 by way of a biological reactor outlet and into biological reactor effluent conduit 4. The biological reactor effluent may comprise treated wastewater and activated sludge. The biological reactor effluent may be directed to a secondary clarifier 5. Secondary clarifier 5 is configured to separate treated wastewater 6 from activated sludge. Activated sludge may further be separated into return activated sludge 7 and waste activated sludge 8. Return activated sludge may be returned to biological reactor 3 to further treat wastewater. Waste activated sludge 7 may be delivered to another location of the system to be further treated. Treated water 6 may be delivered to, for example, surface waters or a processing plant.

Wastewater treatment system 300 may further comprise a diverter 9 configured to divert flow of source of wastewater 1 from biological reactor 3 to a fixed film biological reactor 11. Diverter 9 may be a valve configured to open and closed based at least in part on a signal from sensor 28. Under normal operating conditions, a portion of the source of wastewater 1 is diverted by diverter 9 away from entering biological reactor 3 to fixed film biological reactor 11. Fixed film biological reactor 11 can be a reactor having a population of biomass fixed onto a support or carrier that allows the biomass to contact pollutants in the wastewater. For example, fixed film biological reactor 11 may comprise moving bed bioreactors, trickling filters, and rotating biological contactors. A bio-film is formed over the surfaces of the carrier and removes pollutants from the wastewater. Depending on the desired effluent, fixed film biological reactor 11 may be any of aerated anoxic, aerobic, and anaerobic. In an embodiment, fixed film biological reactor 11 may be an aerated anoxic zone including an aerator providing dissolved oxygen sufficient to maintain anoxic conditions and contributing to the movement of the contents of fixed film biological reactor 11 if desired. Under normal operating conditions, fixed film biological reactor 3 may provide an effluent comprising biological solids. In some embodiments, fixed film effluent may be optionally directed to biological reactor 3 via return fixed film effluent conduit 12 to separate the biological solids from wastewater.

In some embodiments, under operating conditions in which an overflow volume of source of wastewater 1 is present, an additional portion of source of wastewater 1 is diverted away from entering biological reactor 3 to fixed film biological reactor 11 based at least in part on a signal from sensor 28. Fixed film effluent may be directed to a ballast reactor tank 15 via a fixed film effluent conduit 13 to separate biological solids from wastewater.

Ballasted system can comprise a ballast reactor tank 15 configured to provide a ballasted effluent 19 and a source of ballast material 17 fluidly connected to the ballast reactor tank 15. In some embodiments, the ballast material can be a magnetic ballast. The magnetic ballast may comprise an inert material. The magnetic ballast may comprise a ferromagnetic material. The magnetic ballast may comprise iron-containing material. In certain embodiments, the magnetic ballast may comprise an iron oxide material. For example, the magnetic ballast may comprise magnetite ($Fe_3O_4$). The magnetic ballast may have a particle size that allows it to bind with biological flocs to provide enhanced settling or clarification and allow it to be attracted to a magnet so that it may be separated from the biological flocs. The particle size of the magnetic ballast may be less than about 40 μm. The particle size of the magnetic ballast may be less than about 20 μm. In some embodiments, the ballast material can be magnetite. The ballast can be added in dry powdered form. In some embodiments, the ballast material may be added by an operator or by machinery. For example, ballast material 17 may be added by a dry feeder.

In some embodiments, ballast reactor tank 15 is fluidly connected to a source of flocculant 18. Flocculant 18 may comprise a material or a chemical that promotes flocculation by causing colloids and particles or other suspended particles in liquids to aggregate, forming a floc. Flocculant 18 may be a polymer. For example, flocculant 18 may be acrylic acid/acrylamide copolymers or modified polyacrylamides.

In some embodiments, ballast reactor tank 15 is fluidly connected to a source of coagulant 16. Coagulant 16 may comprise cations that interact with negatively charged particles and molecules that reduce the barriers to aggregation. For example, coagulant 16 may comprise aluminum, iron, calcium, or magnesium. Coagulant 16 may further comprise bentonite clay, polyaluminum chloride, polyaluminum hydroxychloride, aluminum chloride, aluminum chlorohydrate, aluminum sulfate, ferric chloride, ferric sulfate, and ferrous sulfate monohydrate.

In some embodiments, ballast reactor tank 15 is fluidly connected to a source of adsorbant 40. Source of adsorbant 40 may comprise an activated carbon. For example, adsorbant 40 may comprise powdered activated carbon.

Ballasted effluent 19 can be directed from ballast reactor tank 15 to a clarifier 20, for example a high-rate clarifier. Clarifier 20 is configured to separate a treated wastewater portion 21 from a ballasted solids portion 29. Treated wastewater portion 21 may be delivered to, for example, surface waters or a processing plant. Ballasted solids portion 29 may further be separated into a waste ballasted solids portion 23 and a recycled ballasted solids portion 22. In some embodiments, all or a portion of ballasted solids portion 29 may be discarded through wasted solids outlet 39. In some embodiments, all of the ballasted solids portion 29 may be discarded through wasted solids outlet 39, for example, when recycling of the ballast may not be desired or necessary. Recycled ballasted solids portion 22 may be returned to ballast reactor 15 to further treat wastewater. Waste ballasted solids portion 23 can further be separated into discarded ballasted solids portion 25 and a ballasted solids recovery portion 30. Discarded ballasted solids portion 25 may be discarded without recovering ballasted solids. Ballast material recovery portion 30 can be directed to a ballast material recovery system 26. Ballast material recovery system 26 may comprise a means for recovering ballast material. Ballast material recovery system may comprise a magnetic separation apparatus. In certain embodiments, mechanical shearing may be employed through the use of a mechanical shearer to shear the biological solids prior to ballast recovery, for example, prior to magnetite recovery. For example, ballast material recovery system 26 may comprise a shear mill, a hydrocyclones, and/or a rotating drum comprising a fixed array of rare-earth magnets. Ballast material recovery system 26 may separate a recovered ballast material portion 30 from a waste solids portion 25. Recovered ballast material portion 30 can be directed back to ballast reactor 15 for further processing.

The methods and systems described herein are not limited in their application to the details of construction and the arrangement of components set forth in the previous description or illustrations in the figures. The methods and systems described herein are capable of other embodiments and of being practices or of being carried out in various ways. Also, the phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, as well as alternate embodiments consisting of the items listed thereafter exclusively.

Use of ordinal terms such as "first," "second," "third," and the like in the specification and claims to modify an element does not by itself connote any priority, precedence, or order of one element over another or the temporal order in which acts of a method are performed, but are used merely as labels to distinguish one element having a certain name from another element having a same name, but for use of the ordinal term, to distinguish the elements.

Those skilled in the art would readily appreciate that the various parameters and configurations described herein are meant to be exemplary and that actual parameters and configurations will depend upon the specific application for which the apparatus and methods of the present disclosure are used. Those skilled in the art will recognize, or be able to ascertain using no more than routine experimentation, many equivalents to the specific embodiments described herein. For example, those skilled in the art may recognize that the system, and components thereof, according to the present disclosure may further comprise a network of systems or be a component of a water treatment system. It is, therefore, to be understood that the foregoing embodiments are presented by way of example only and that, within the scope of the appended claims and equivalents thereto, the disclosed systems and methods may be practiced otherwise than as specifically described. The present systems and methods are directed to each individual feature, system, or method described herein. In addition, any combination of two or more such features, systems, or methods, if such features, systems, or methods are not mutually inconsistent, is included within the scope of the present disclosure. The steps of the methods disclosed herein may be performed in the order illustrated or in alternate orders and the methods may include additional or alternative acts or may be performed with one or more of the illustrated acts omitted.

Further, it is to be appreciated that various alterations, modifications, and improvements will readily occur to those skilled in the art. Such alterations, modifications, and improvements are intended to be part of this disclosure, and are intended to be within the spirit and scope of the disclosure. In other instances, an existing facility may be modified to utilize or incorporate any one or more aspects of the methods and systems described herein. Thus, in some instances, the systems may involve connecting or configuring an existing facility to comprise a treatment system or components of a treatment system, for example, using the methods and systems comprising baffles controlled at least in part responsive to nitrogen species concentration measurements in the treatment system as disclosed herein. Accordingly, the foregoing description and figures are by way of example only. Further, the depictions in the figures do not limit the disclosures to the particularly illustrated representations.

While exemplary embodiments of the disclosure have been disclosed, many modifications, additions, and deletions may be made therein without departing from the spirit and scope of the disclosure and its equivalents, as set forth in the following claims.

The invention claimed is:

1. A system for treating wastewater, comprising:
a first biological reactor fluidly connected to a source of wastewater and having a treated wastewater outlet, further comprising a first clarifier fluidly connected to the treated wastewater outlet and configured to provide a first treated effluent;
a second biological reactor being a fixed film biological reactor connected to the source of wastewater and having a fixed film effluent outlet;
a ballasted system fluidly connected to the fixed film effluent outlet, the ballasted system comprising:
a ballast reactor tank configured to provide a ballasted effluent; and
a source of ballast material fluidly connected to an inlet of the ballast reactor tank; and
a bypass line having an inlet fluidly connected to the source of wastewater, a first outlet fluidly connected to the ballasted system, and a second outlet fluidly connected to the fixed film biological reactor, the bypass line configured to bypass the fixed film biological reactor.

2. The system of claim 1, wherein the ballast material is magnetic.

3. The system of claim 2, wherein the ballast material is magnetite.

4. The system of claim 1, further comprising a source of flocculant fluidly connected to an inlet of the ballast reactor tank.

5. The system of claim 1, further comprising a source of coagulant fluidly connected to an inlet of the ballast reactor tank.

6. The system of claim 1, wherein the second treated effluent comprises about 100 mg/l to about 500 mg/l of biological solids.

7. The system of claim 1, further comprising a second clarifier fluidly connected to an outlet of the ballast reactor tank, the second clarifier comprising a second treated effluent outlet and a ballasted solids outlet and configured to separate the ballasted effluent into a second treated effluent from a ballasted solids portion.

8. The system of claim 1, wherein the fixed film biological reactor comprises a carrier onto which biomass is fixed.

* * * * *